Figure 1:
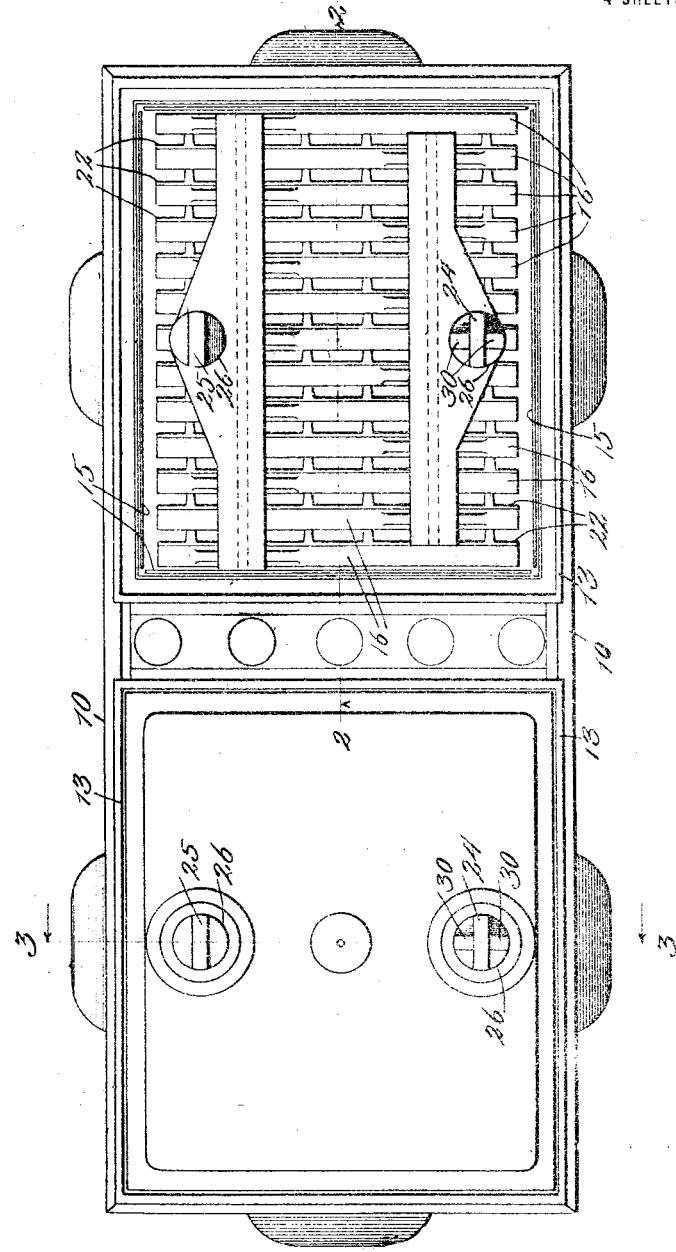

F. ENGEL.
STORAGE BATTERY.
APPLICATION FILED FEB. 19, 1909.

1,182,257.

Patented May 9, 1916.
4 SHEETS—SHEET 1.

Witnesses:

Inventor:
Frank Engel
By Edwin B. H. Tower, Jr.
Atty.

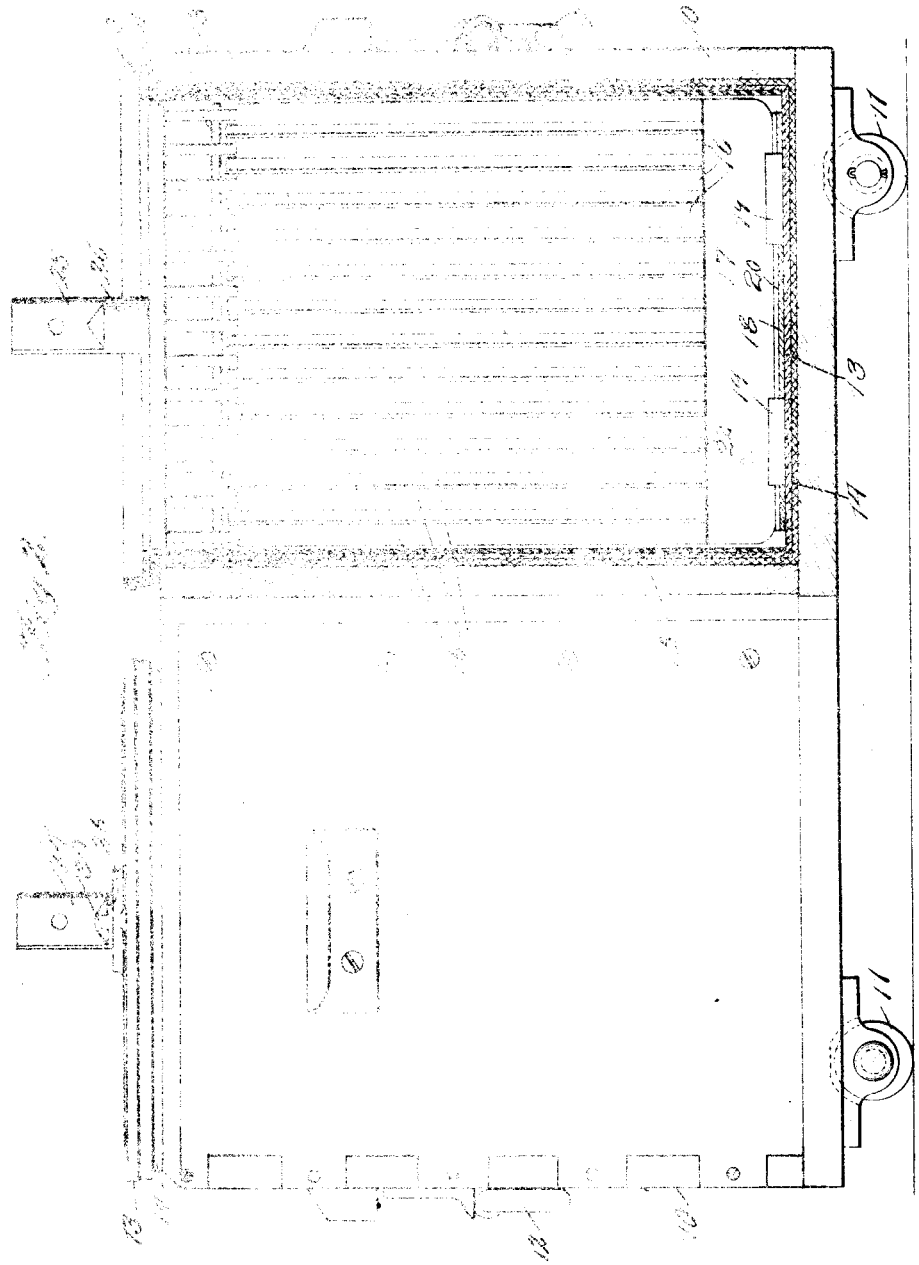

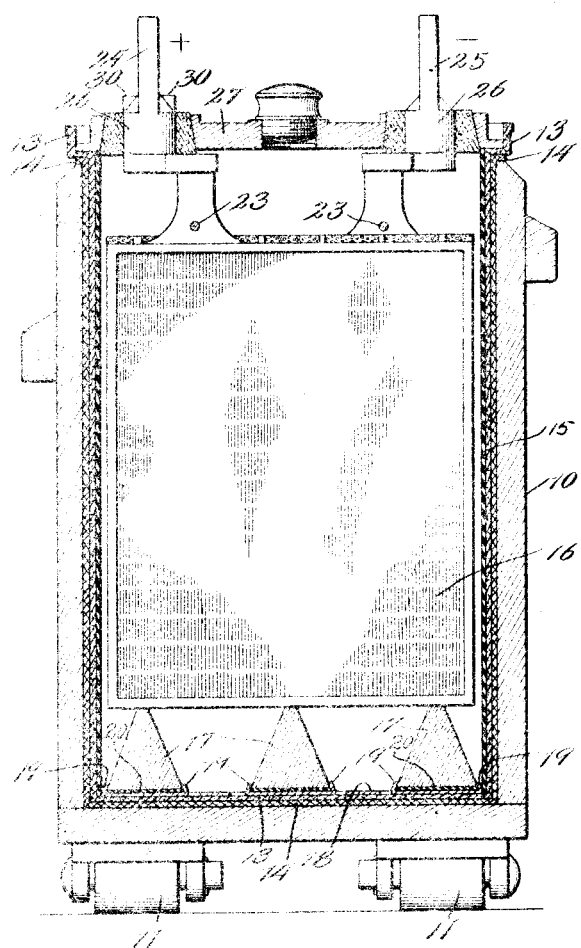

F. ENGEL.
STORAGE BATTERY.
APPLICATION FILED FEB. 13, 1915.
1,182,257.
Patented May 9, 1916.
4 SHEETS—SHEET 4.
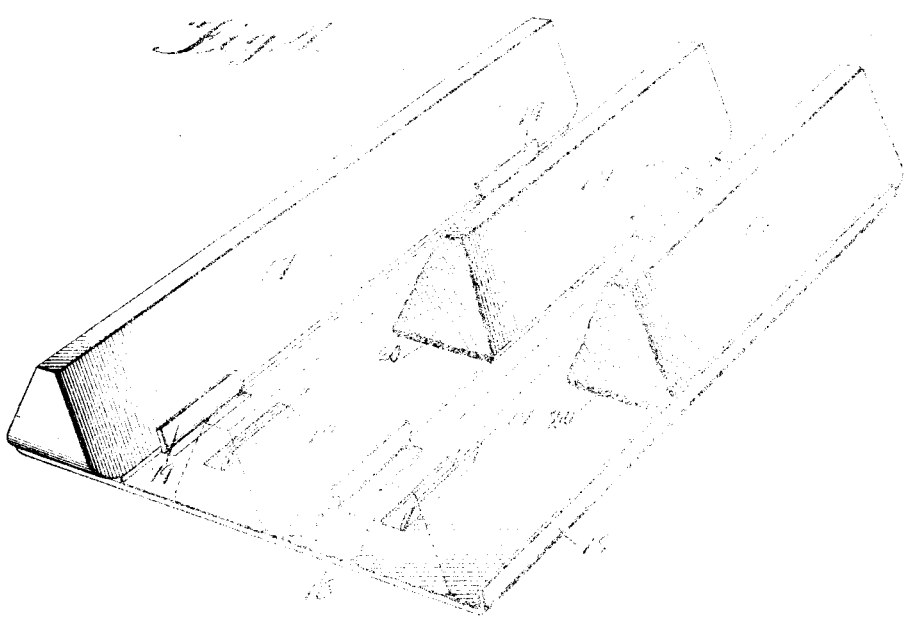
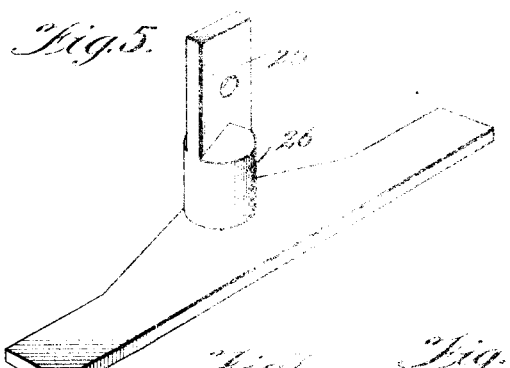
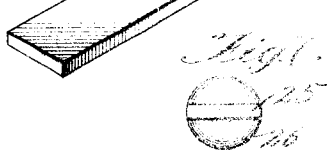
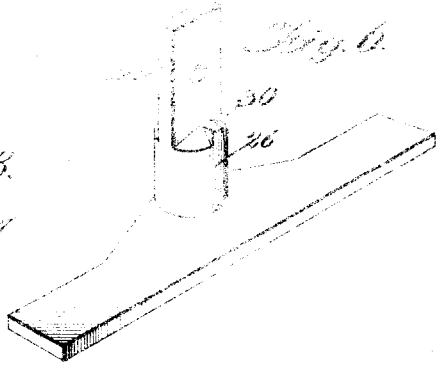
Witnesses:
Inventor:
Frank Engel

UNITED STATES PATENT OFFICE.

FRANK ENGEL, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

STORAGE BATTERY.

1,182,257.  Specification of Letters Patent.  Patented May 9, 1916.

Application filed February 19, 1909. Serial No. 478,991.

*To all whom it may concern:*

Be it known that I, FRANK ENGEL, a citizen of the United States, residing at Buffalo, in the county of Erie and State of New York, have invented a certain new and useful Improvement in Storage Batteries, of which the following is a specification.

My invention relates to storage batteries.

An object of the invention is to provide improved means for supporting the battery plates. I accomplish this and other objects in the manner illustrated in the accompanying drawings in which—

Figure 1 is a plan of a two cell battery embodying the invention. Fig. 2 is a side elevation thereof, the right half of the drawing being in section on the line 2—2 Fig. 1. Fig. 3 is a vertical section taken on the line 3—3 of Fig. 1. Fig. 4 is a perspective view of the support for the battery plate. Figs. 5 and 6 are perspective views of the negative and positive battery terminals respectively. Figs. 7 and 8 are plan views of the ends of the terminals shown in Figs. 5 and 6 respectively, the same showing the appearance of the minus and plus signs respectively.

In the drawings similar reference characters denote similar parts.

The type of battery illustrated is especially applicable to car lighting or under other circumstances where the battery is subjected to considerable vibration. In this form there is an outer box or casing 10 consisting preferably of wood. To render it portable it may be provided with rollers 11 and handles 12. Within this casing is a water tight lining 13 of sheet lead or similar material, and it is desirable that the space between the casing and the lining be filled with some such substance as paraffin, as indicated at 14. As the lining is water tight it will contain without leakage the dilute sulfuric acid solution or whatever electrolyte is employed. Inside the lining are placed sheets 15 of rubber or similar insulating material, the purpose being to prevent contact between the lining and the battery plates or electrodes 16. Said battery plates, when properly assembled, alternate with each other, there being first a negative, then a positive plate, and so on. The major portion of the weight of these plates is carried by supporting blocks 17, which consist of porcelain or other insulating material and are preferably of the shape approximately of a triangular prism. These blocks are removably mounted in a particular manner which constitutes one of the features of improvement. A plate 18 of a size slightly less than the horizontal area of the inner lining is placed loosely in the bottom of the vessel and has overturned lateral edges and at suitable intervals lugs 19 thrown up in position to engage the lower lateral edges of the insulating blocks 17. These lugs are integral with said plate and are formed preferably by stamping. They are comparatively short and consequently do not materially lessen the strength of the plate. As the lugs engage only the edges and not the ends of the insulating blocks, the blocks may be slipped out endwise for cleaning or renewal, except when the plate is within the casing, at which time the blocks are held from endwise movement by the ends of the lining 13. As a result of this construction the supporting blocks and plate may be removed at any time for cleaning. This greatly increases the durability of the battery and facilitates inspection, for during the normal action of a battery of this kind sediment from the plates forms an insoluble sulfate which tends to collect beneath and around the supports and attacks the lead lining and would in time destroy it. With the blocks and plate removable as in this construction, the parts may be frequently inspected and cleaned, and such harmful action prevented.

Although not essential, it is desirable that strips 20 of basswood or other substance be interposed between the bottom of the insulating blocks and the plate or false bottom 18. These serve to cushion the blocks and save them from the vibration they would receive if they came into direct contact with the metal. They also serve to protect the plate from any roughness or projections on the bottom of the blocks.

In order to prevent the battery plates from coming into physical contact with each other at their faces, separators 22 are employed. They consist of hard rubber or other suitable material and are, of course, immersed in the electrolyte when the battery is in use. This produces a certain amount of buoyancy in the separators, especially when the denser electrolytes are employed. I prevent any rise of the separators by means of rods 23, 23 of hard rubber or other suitable material passing through apertures located in the battery plates just above the upper edges of the separators. When the battery plates are lowered into position the rods will be prevented from endwise movement by the ends of the receptacle, and no other securing means is necessary.

Each battery plate is connected to one or the other of the battery terminals 24, 25, depending upon whether the plate is a negative or a positive one. The base portion 26 of each terminal is cylindrical to facilitate its fitting into the circular apertures provided for it in the cover 27. The upper portions of the terminals are flattened to afford greater contact surface for the wires leading to the exterior circuit.

In practical use it is essential that the user should be able to tell at a glance which terminal is positive and which negative. Markings have been employed for the purpose, for example, red paint or other pigment has been applied to a specific one of the terminals. But this is unsatisfactory as the pigment is apt to wear off and the user is liable to forget which terminal it is intended to indicate. I have produced permanent means whereby the user may readily distinguish which is the positive and which the negative terminal. At the middle of the flat upper portion of the positive terminal 24 are formed two extensions 30, 30 with the result that when viewed directly from above, this terminal exhibits the plus sign thus, +, which is known by every one who is at all familiar with electricity to always indicate positive as distinguished from negative. In my battery the negative terminal 25 is left plain and when viewed from above exhibits merely a narrow rectangle extending across the circular base 26. This rectangle has the appearance of the minus sign, thus, —, which is well known to represent negative in distinction to positive. Consequently by merely glancing down upon the battery terminals from above the "positive" sign will appear on the positive terminal and the "negative" sign on the negative terminal.

In the preferred construction the side extensions 30 of the positive terminal are formed by conically tapering the upper end of the cylindrical base 26 except at the flat upper portion 24 and at the said extensions, the latter being raised from the base and having their upper surface lying in a horizontal plane.

With the construction as above described, the positive and negative markings are so large and plain and substantial that they may be distinguished from a distance, and practically can never be destroyed from the effects of ordinary use.

What I claim as new and desire to secure by Letters Patent, is:

1. A support for battery plates comprising a plate of non-resilient material, opposite edges of said plate being upturned and bent over at an acute angle to the surface of said plate, integral lugs struck up from the face of said plate and bent over at acute angles to said surface, certain of said lugs being bent toward each of said bent-over edges to form under-cut guideways, and blocks of insulating material provided with wide, flat bases shaped to interlock with said under-cut guideways, whereby said blocks may be attached to and detached from said plate only by a sliding movement parallel with the plate surface.

2. Supporting means for storage battery electrodes comprising a lead plate having a pair of inturned opposite edges, intermediate lugs struck up at an angle from said plate, triangular bars of insulating material arranged on said plate, and a strip of cushioning material between each of said bars and said plate, certain of said bars being engaged on one side by one of said edges and on the other side by certain of said lugs whereby said insulating bars are firmly held to said plate.

FRANK ENGEL.

Witnesses:
T. G. SWANNIE,
ROBERT BRADEN.